No. 671,886. Patented Apr. 9, 1901.
E. J. HICKS.
RADIATOR FOR INCUBATORS.
(Application filed Dec. 20, 1900.)
(No Model.)
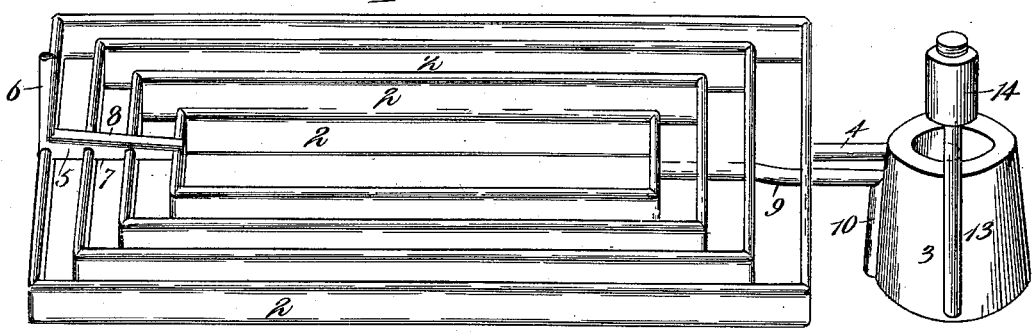
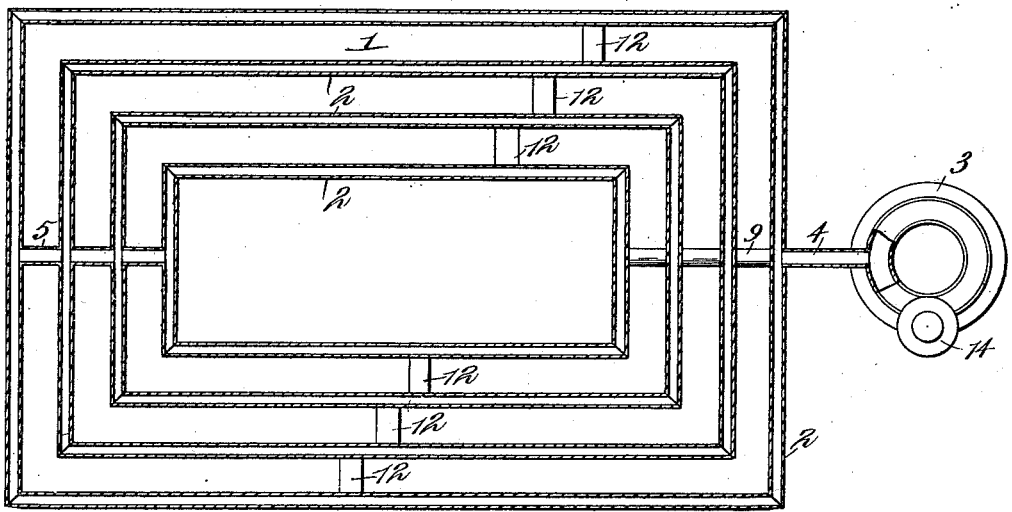
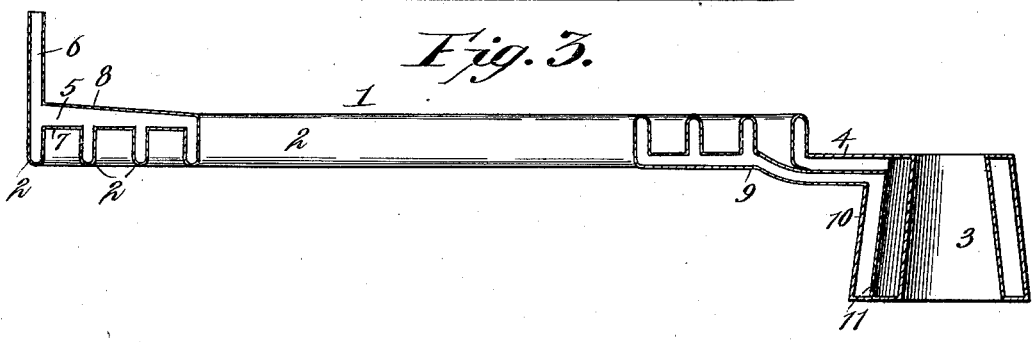
Witnesses
E. J. Hicks, Inventor
Attorneys

UNITED STATES PATENT OFFICE.

EDWIN JACOB HICKS, OF ATCHISON, KANSAS.

RADIATOR FOR INCUBATORS.

SPECIFICATION forming part of Letters Patent No. 671,886, dated April 9, 1901.

Application filed December 20, 1900. Serial No. 40,562. (No model.)

*To all whom it may concern:*

Be it known that I, EDWIN JACOB HICKS, a citizen of the United States, residing at Atchison, in the county of Atchison and State of Kansas, have invented a new and useful Radiator for Incubators, of which the following is a specification.

The invention relates to improvements in radiators for incubators.

One object of the present invention is to improve the construction of radiators for heating incubators and to provide a simple and comparatively inexpensive one having a maximum heating-surface and adapted to prevent superheating at its center, and to reduce the quantity of water to a minimum to avoid the leaks which result from the employment of a large quantity of water.

Another object of the invention is to provide a device of this character by which the eggs will not be subjected to direct heat and in which air will not be pocketed and interfere with the circulation of the water.

The invention consists in the construction and novel combination and arrangement of parts hereinafter fully described, illustrated in the accompanying drawings, and pointed out in the claims hereto appended.

In the drawings, Figure 1 is a perspective view of a radiator for incubators constructed in accordance with this invention. Fig. 2 is a horizontal sectional view. Fig. 3 is a longitudinal sectional view.

Like numerals of reference designate corresponding parts in all the figures of the drawings.

1 designates a radiator composed of a series of concentric rectangular frames or conduits 2, arranged one within the other and having parallel sides and ends, as clearly illustrated in Fig. 2 of the accompanying drawings, and designed to be located within an incubator, at the top thereof, for heating the air at that point, so that the heated air will be diffused throughout the incubator without subjecting the eggs to any direct heat. The tubular frames or conduits, which form radiating-circuits, are preferably oblong in cross-section to divide the water into a continuous thin sheet or stream to reduce the quantity of water to a minimum and lessen the danger of leaks resulting from the use of a large quantity of water, and the said radiator may be made of any desired dimensions to suit the capacity of the incubator to be heated.

The outer frame or conduit of the radiator is connected at one end with a boiler 3 by a short inlet or supply pipe 4, and the hot water is caused to circulate around the radiator through the marginal conduit or frame to the opposite end of the radiator, where all of the radiator frames or conduits are connected by a longitudinal conduit 5, through which the heated water flows and which delivers the same to the inner frames or conduits. This longitudinal connecting-conduit 5, which is arranged at the rear end of the radiator, tapers inwardly and is connected at its outer end to a vertical air-escape pipe 6, which permits the escape of any air collecting within the radiator. The bottom wall 7 of the longitudinal connecting-conduit is disposed in a horizontal plane, and the top wall 8, which is inclined, extends upward from the inner end of the conduit 5 to the air-escape pipe 6, and it forms a longitudinal airspace which extends above the upper edges of the tubular frames and above the surface of the water, so that the air will be permitted to escape freely and will be prevented from being carried inward into the inner frames or conduits. The hot water circulates through the inner tubular frames or conduits, passing to the front end of the radiator, and the said inner tubes or frames are connected at the front by a longitudinal pipe or conduit 9, disposed in alinement with the conduit 8, and extending beneath the supply or inlet pipe 4. The front connecting pipe or conduit 9 is provided with a depending branch 10, arranged contiguous to the boiler and connected with the same, near the bottom thereof, by means of an opening 11. By passing the water around the sides of the radiator through the outer or marginal tube or frame a hot central portion is prevented, and the radiator is provided with a central open space through which the air may circulate freely and which also coöperates to prevent a superheated center. The frames are connected at opposite sides at different points by short webs or cross-pieces 12 to form a rigid structure; but any other suitable means may be provided for this purpose.

The boiler, which is preferably tapered, as shown, is provided with a central opening or space and is composed of inner and outer shells suitably connected at the top and bottom and adapted to divide the water into a comparatively thin sheet to subject it thoroughly to the action of the heat and to enable it to be heated sufficiently by a comparatively small heating apparatus. The boiler is provided with a filling-tube 13, having a cup or receptacle 14 at its upper end to facilitate supplying the device with water. The lower end of the filling-tube 13 is connected with the boiler, near the bottom thereof, and the pressure of the water within the filling-tube is adapted to expel any air from the radiator, such air being permitted to escape through the pipe 6 at the opposite end of the radiator.

It will be seen that the radiator is simple and comparatively inexpensive in construction, that it avoids a hot center, and that while it presents a large amount of heating-surface it is adapted to be arranged at the top of an incubator, so that the eggs will not be subjected to direct heat. Furthermore, it will be clear that only a comparatively small quantity of water is required and that air is prevented from becoming pocketed in it and interfering with the circulation of the water. Furthermore, it will be apparent that as the hot water from the boiler is conducted around the sides and ends of the radiator before it is admitted to the inner frames or tubes its temperature will be somewhat modified before reaching the latter and the heat will not be concentrated at any one point.

What I claim is—

1. The combination of a plurality of substantially concentrically arranged radiating-circuits, a supply-pipe communicating with the outer of the circuits at one end of the radiator, a connecting-conduit providing communication between the circuits at the opposite end of the radiator, and a return-pipe communicating with the inner of the radiating-circuits, substantially as described.

2. The combination of a plurality of substantially concentrically arranged radiating-circuits, a supply-pipe communicating with the outer of the circuits at one end of the radiator, a connecting-conduit providing communication between the circuits at the opposite end of the radiator and projecting above the said circuits to provide an air-space, an air-escape pipe communicating with the air-space of the connecting-conduit, and a return-pipe communicating with the inner of the radiating-circuits, substantially as described.

3. A radiator comprising a plurality of substantially concentrically arranged radiating-circuits, the supply and return pipes, one of such pipes communicating with the outer of the circuits, and the other pipe communicating with the inner of the circuits, and a connecting-conduit providing communication between the circuits at a point remote from the said pipes, substantially as described.

In testimony that I claim the foregoing as my own I have hereto affixed my signature in the presence of two witnesses.

EDWIN JACOB HICKS.

Witnesses:
J. H. KIENZLE,
TODD HENDERSON.